E. J. FUGERE.
SCREW STOCK AND TAP WRENCH.
APPLICATION FILED MAR. 1, 1911.
997,665.
Patented July 11, 1911.
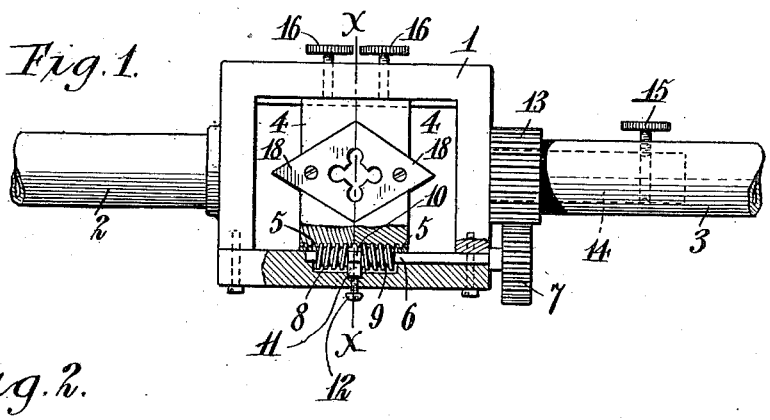
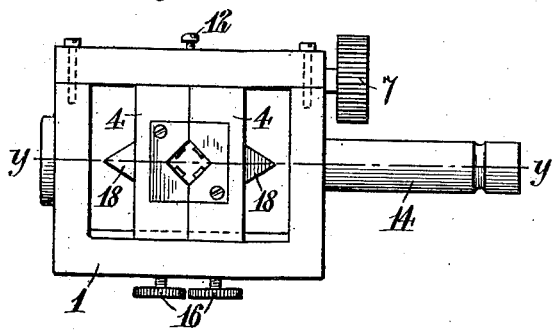
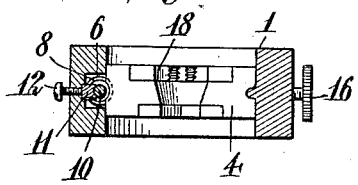
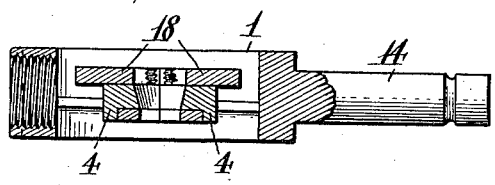
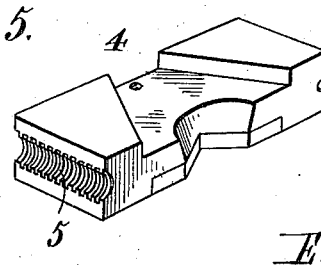
Witnesses
Christ Finke, Jr.
U. B. Hillyard.
Inventor,
Edward J. Fugere.
By Victor J. Evans,
Attorney

UNITED STATES PATENT OFFICE.

EDWARD J. FUGERE, OF TURNERS FALLS, MASSACHUSETTS.

SCREW-STOCK AND TAP-WRENCH.

997,665.

Specification of Letters Patent.   Patented July 11, 1911.

Application filed March 1, 1911. Serial No. 611,610.

*To all whom it may concern:*

Be it known that I, EDWARD J. FUGERE, a citizen of the United States, residing at Turners Falls, in the county of Franklin and State of Massachusetts, have invented new and useful Improvements in Screw-Stocks and Tap-Wrenches, of which the following is a specification.

The present invention provides a tool for cutting screwthreads upon rods of varying sizes within certain limits and which also may be used for turning screw cutting taps, said tool embodying adjustable die holders which may be moved by means of the operating handle at any time during the cutting of the thread or which may be set to any position and secured so as to cut a thread upon an object of given size.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a plan view of a tool of the character stated embodying the invention, parts being broken away. Fig. 2 is a reverse view of the stock, the handles being detached. Fig. 3 is a transverse section on the line $x$—$x$ of Fig. 1. Fig. 4 is a longitudinal section on the line $y$—$y$ of Fig. 2, the outer portion of the pin being in full lines. Fig. 5 is a detail perspective view of one of the die holders.

Corresponding and like parts are referred to in the following description, and indicated in all the views of the drawing, by the same reference characters.

The stock 1 may be of any construction and is provided at opposite ends with handles 2 and 3. Die holders 4 are slidably mounted in the stock 1 and have screw cutting and tap dies fitted to opposite sides, said dies being preferably fitted in recesses formed in the holders. One end of each holder 4 has a screwthread portion 5, which matches the threads of a feed screw 6 located at one side of the stock and having an end portion projecting and provided with a pinion 7, which is secured thereto. The feed screw has enlarged portions 8 and 9 upon opposite sides of a reduced portion 10. The part 8 has a screwthread formed thereon in an opposite direction to the screwthread provided on the part 9. The threaded portions 5 of the die holders match the screwthreaded parts 8 and 9 of the feed screw so that rotation of the feed screw moves the die holders in opposite directions either to bring them together or to move them apart. A block 11 is fitted in the reduced portion 10 of the feed screw and is adjusted by means of a set screw 12, which compensates for wear and holds the threaded portions of the feed screw in engagement with the threaded parts 5 of the die holders. The handle 3 has a pinion 13 formed thereon to mesh with the pinion 7. Rotation of the handle 3 causes a turning of the feed screw and the latter by reason of its screwthread connection with the die holders adjusts them. The handle 3 is fitted upon a pin 14 projecting from the stock 1, said pin having an annular groove to receive the inner end of a set screw 15 threaded into the handle 3 for holding said handle upon the pin. The die holders when adjusted may be secured by means of set screws 16 threaded into openings formed in a side member of the stock 1.

The die holders 4 are of similar formation and are mounted in the stock to move therein. Recesses are formed in opposite sides of each die holder to form seats in which the dies are fitted and secured by means of screws or like fastening means. The tap dies are of rectangular formation and have V-shaped notches in their outer edges. The screw cutting dies 18 are of triangular form. The meeting edges of the die holders have recesses to form clearance for the cuttings and to receive the shanks of the screw cutting taps. The recesses formed in the sides of the die holders to receive the die conform to the shape of the dies so as to snugly receive the same.

In the use of the tool the dies may be adjusted to the size of the work to be threaded or to the size of the tap to be held by rotating the handle 3, which causes a turning of the feed screw 6 and a movement of the die holders either to separate the dies or to bring them closer together according to requirements. The position of the dies may be fixed by tightening the set screws 16. In the event of it being required to cut a thread and to simultaneously adjust the dies the operation may be performed by grasping the handle 3 and rotating the same about its axis simultaneously with applying force thereto for turning the stock.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In combination a stock, members adjustably mounted in the stock and having screwthread portions, a feed screw having its threaded portion in engagement with the threaded portion of the aforesaid adjustable members, and a handle rotatably mounted upon the stock and having connection with the feed screw to effect rotation thereof.

2. In combination a stock, members mounted in the stock and adjustable toward and away from each other and having screwthread portions, a feed screw mounted upon the stock and having right and left hand threaded portions in mesh with the screwthread portions of the aforesaid adjustable members, a handle rotatably mounted upon the stock, and connecting means between the handle and feed screw whereby rotation of the handle is imparted to the feed screw.

3. In combination a stock, members mounted in the stock and adjustable toward and away from each other and provided with threaded portions, a feed screw mounted in the stock and having its threaded portion in engagement with the threaded portion of the aforesaid adjustable members, a set screw for adjusting the feed screw to maintain proper engagement between the threaded portions of the aforesaid adjustable members and feed screw, and means for rotating the feed screw to effect adjustment of the said members.

4. In combination a stock, members adjustably mounted in the stock and movable toward and away from each other and having threaded portions, a feed screw mounted in the stock and having right and left hand threaded portions in engagement with the threaded portions of the said adjustable members, said feed screw having a projecting end, a pinion secured to the projecting end of the feed screw, a pin projecting from the stock, and a handle rotatably mounted upon the pin and having a pinion in mesh with the pinion of the feed screw.

In testimony whereof I affix my signature in presence of two witnesses.

EDWARD J. FUGERE.

Witnesses:
F. L. SPENCER,
ARTHUR DARGMAULT.

---

Copies of this patent may be obtained for five cents each, by addressing the "Commissioner of Patents, Washington, D. C."